(12) United States Patent
You

(10) Patent No.: US 12,546,612 B2
(45) Date of Patent: Feb. 10, 2026

(54) METHOD AND SYSTEM FOR PROVIDING RIDE POSITIONING SERVICE

(71) Applicants: Hyundai Motor Company, Seoul (KR); Kia Corporation, Seoul (KR)

(72) Inventor: Kyungjin You, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 560 days.

(21) Appl. No.: 17/690,844

(22) Filed: Mar. 9, 2022

(65) Prior Publication Data

US 2023/0095721 A1 Mar. 30, 2023

(30) Foreign Application Priority Data

Sep. 29, 2021 (KR) ........................ 10-2021-0129123

(51) Int. Cl.
| | |
|---|---|
| G01C 21/34 | (2006.01) |
| G01C 21/36 | (2006.01) |
| G06Q 50/40 | (2024.01) |
| G07B 15/02 | (2011.01) |

(52) U.S. Cl.
CPC ..... *G01C 21/3438* (2013.01); *G01C 21/3423* (2013.01); *G01C 21/3461* (2013.01); *G01C 21/367* (2013.01); *G01C 21/3694* (2013.01); *G01C 21/3697* (2013.01); *G06Q 50/40* (2024.01); *G07B 15/02* (2013.01)

(58) Field of Classification Search
CPC ............ G01C 21/3438; G01C 21/3423; G01C 21/3461; G01C 21/367; G01C 21/3694; G01C 21/3697; G06Q 50/40; G07B 15/02
See application file for complete search history.

(56) References Cited

U.S. PATENT DOCUMENTS

| 11,089,440 B1* | 8/2021 | Sawahashi | .............. H04W 4/42 |
| 2014/0074757 A1* | 3/2014 | De Gennaro | .......... G07B 13/04 |
| | | | 705/417 |
| 2019/0088141 A1 | 3/2019 | Liu | |

(Continued)

FOREIGN PATENT DOCUMENTS

| JP | 2019-053733 A | 4/2019 |
| KR | 10-1812775 B1 | 1/2018 |
| KR | 10-2086154 B1 | 4/2020 |

*Primary Examiner* — Peter D Nolan
*Assistant Examiner* — Wae L Louie
(74) *Attorney, Agent, or Firm* — MORGAN, LEWIS & BOCKIUS LLP

(57) ABSTRACT

A ride positioning service providing method includes: by service providing server, receiving starting position and destination along with call request from user terminal, receiving non-preference option for specific road type from driver terminals, determining each of the driver terminals as walking ride group or general ride group according to whether a road to which the starting position belongs is the non-preference option, determining the starting position as general ride point of the taxi, and one position selected from an area within a certain range based on the starting position as a walking ride point of the taxi, and requesting a call to the driver terminal forming at least one group among the walking ride group and the general ride group based on at least one ride point among the walking ride point and the general ride point based on weather information of a position of the user terminal.

16 Claims, 7 Drawing Sheets

(56) References Cited

U.S. PATENT DOCUMENTS

| | | | |
|---|---|---|---|
| 2020/0240805 A1* | 7/2020 | Kanajan | G05D 1/0088 |
| 2022/0156870 A1* | 5/2022 | Jiang | B60R 21/12 |
| 2022/0188957 A1* | 6/2022 | Fu | G06Q 50/265 |
| 2022/0276066 A1* | 9/2022 | Beaurepaire | G01C 21/3492 |
| 2022/0300898 A1* | 9/2022 | Aoyagi | G06Q 10/02 |
| 2023/0095721 A1* | 3/2023 | You | G01C 21/3461 |
| | | | 701/516 |
| 2023/0114415 A1* | 4/2023 | Livne | B60W 40/09 |
| | | | 701/410 |

* cited by examiner

FIG. 2A
FIG. 2B
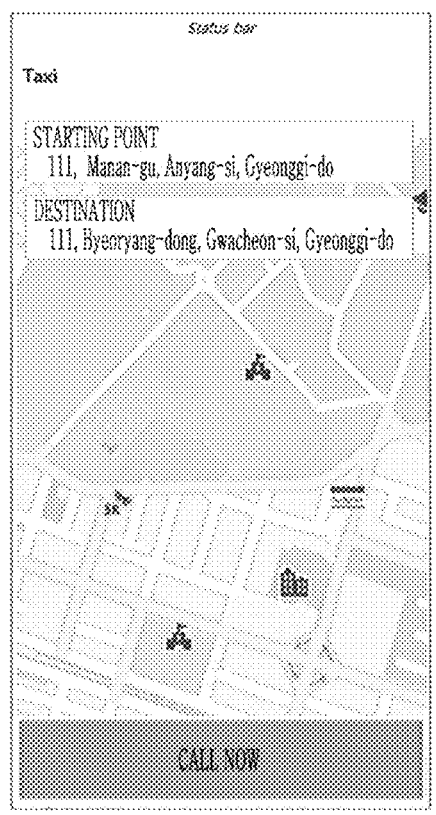
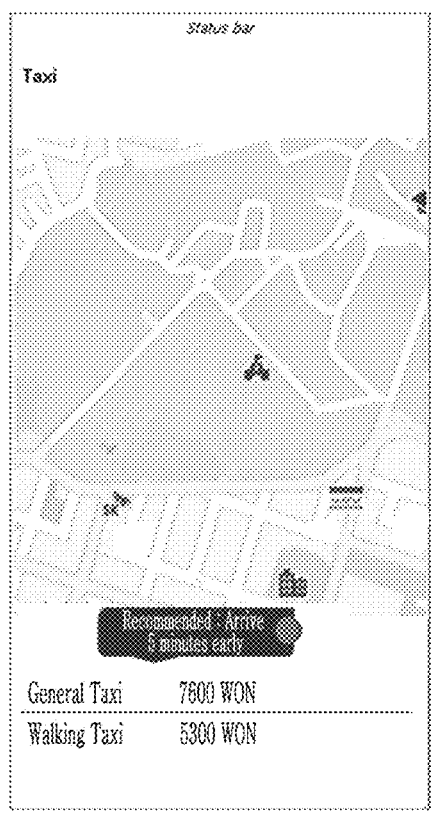

METHOD AND SYSTEM FOR PROVIDING RIDE POSITIONING SERVICE

CROSS-REFERENCE TO RELATED APPLICATION

The present application claims priority to Korean Patent Application No. 10-2021-0129123 filed on Sep. 29, 2021, the entire contents of which is incorporated herein for all purposes by this reference.

BACKGROUND OF THE INVENTION

Field of the Invention

The present disclosure relates to a method for providing a ride positioning service and a system for providing a ride positioning service.

Description of Related Art

Conventionally, when requesting a taxi call, it is common to call based on a current position of a user, but there are cases where a fare varies according to a ride position within an actual 500 m radius.

Also, there are cases where taxi drivers do not prefer specific roads such as one-way roads, so there is a need for a call request that reflects this.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present disclosure are directed to providing a method and a system that provides a service for determining a ride position based on a road non-preference of the driver and weather information.

A ride positioning service providing method according to an exemplary embodiment of the present disclosure may include receiving, by a service providing server, a starting position and a destination along with a call request from a user terminal, receiving, by the service providing server, a non-preference option for a predetermined road type from a plurality of driver terminals, determining, by the service providing server, each of the driver terminals as a walking ride group or a general ride group according to whether a road to which the starting position belongs is the non-preference option, determining, by the service providing server, the starting position as a general ride point of a taxi, and one position selected from an area within a predetermined range based on the starting position as a walking ride point of the taxi, and requesting, by the service providing server, a call to the driver terminal forming at least one group among the walking ride group and the general ride group based on at least one ride point among the walking ride point and the general ride point based on weather information of a position of the user terminal.

The requesting of the call to the driver terminal forming at least one group may include requesting, by the service providing server, the call to the driver terminal forming the walking ride group and the driver terminal forming the general ride group based on one ride point selected among the walking ride point and the general ride point when the weather information does not correspond to a predetermined weather condition.

The requesting of the call to the driver terminal forming the walking ride group and the driver terminal forming the general ride group may include: determining, by the service providing server, a first fare expected to be required on a path to move by a taxi from the walking ride point to the destination, determining, by the service providing server, a second fare expected to be required on a path to move by a taxi from the general ride point to the destination, and providing, by the service providing server, the first fare and the second fare to the user terminal.

The requesting of the call to the driver terminal forming at least one group may include requesting, by the service providing server, the call to the driver terminal forming the general ride group based on the general ride point when the weather information of the position of the user terminal corresponds to a predetermined weather condition.

The requesting of the call to the driver terminal forming the general ride group may include: determining, by the service providing server, an expected fare expected to be required on a path to move by the taxi from the general ride point to the destination, and providing, by the service providing server, the expected fare to the user terminal.

The determining as the walking ride point may include: determining, by the service providing server, a plurality of ride candidate positions according to a size of the road in the area within the predetermined range and the path to be moved by the taxi to the destination based on the starting position, and determining, by the service providing server, a position indicated by a signal received from the user terminal among the plurality of ride candidate positions as the walking ride point.

The determining of a plurality of ride candidate positions may include: deriving, by the service providing server, a plurality of preliminary ride positions according to a size of the road in the area within the predetermined range based on the starting position, and deriving, by the service providing server, each path to move by the taxi from the plurality of preliminary ride positions to the destination, and determining a plurality of ride candidate positions among the plurality of preliminary ride positions according to a result of comparing distances of each of the derived paths with each other.

Dispatching, by the service providing server, a call to one of a plurality of first driver terminals that have accepted the call request may be further included.

When the plurality of first driver terminals have accepted the call request based on the walking ride point, the dispatching of the call may include: predicting, by the service providing server, a first travel time to arrive at the walking ride point by moving on foot from the position of the user terminal, estimating, by the service providing server, a plurality of second travel times to arrive at the walking ride point by moving from each position of the plurality of first driver terminals by the taxi, determining, by the service providing server, a plurality of error times between the plurality of second travel times and the first travel time, and dispatching, by the service providing server, a call to one of the plurality of first driver terminals based on the plurality of error times.

When a plurality of first driver terminals have accepted the call request based on the general ride point, the dispatching of the call may include: predicting, by the service providing server, a time to arrive at the walking ride point by moving by the taxi from each position of the plurality of first driver terminals, and dispatching, by the service providing server, a call to one driver terminal of a plurality of first driver terminals based on the predicted time through the service providing server.

A ride positioning service providing system according to an exemplary embodiment of the present disclosure as a ride positioning service providing system for receiving a call request, a starting position of the call request, and a destination of the call request from a user terminal, and transmitting the call request to a plurality of driver terminals, includes: a service providing server configured for receiving a non-preference option for a predetermined road type from a plurality of driver terminals, determining a walking ride group including a driver terminal using a road to which the starting position belongs as the non-preference option and a general ride group including a driver terminal not using the road to which the starting position belongs as the non-preference option, determining the starting position as a general ride point of the taxi and one position selected from the area within a predetermined range based on the starting position as a walking ride point of the taxi, and requesting a call to the driver terminal forming at least one group of the walking ride group and the general ride group based on at least one ride point of the walking ride point and the general ride point based on weather information of a position of the user terminal.

The service providing server may include: a call control module configured for receiving the starting position and the destination from the user terminal to determine the starting position as a general ride point of the taxi, a ride group determination module configured for receiving the non-preference option for each terminal from the plurality of driver terminals, and determining a walking ride group including a driver terminal having the road to which the starting position belongs as the non-preference option and a general ride group including a driver terminal not taking the road to which the starting position belongs as the non-preference option, a general call module configured for requesting a call to the driver terminal forming the general ride group based on the general ride point when the weather information of the position of the user terminal corresponds to the predetermined weather condition, and a walking call module configured for determining one position selected from an area within a predetermined range as the walking ride point of the taxi based on the starting position when the weather information does not correspond to the predetermined weather condition, and requesting a call request to the driver terminal forming the walking ride group and the driver terminal forming the general ride group based on one ride point selected from the walking ride point and the general ride point.

The walking call module may determine a plurality of ride candidate positions according to a size of the road in the area within the predetermined range based on the starting position and the path to move by the taxi to the destination, and the walking ride point may be determined as the position indicated by the signal received from the user terminal among a plurality of ride candidate positions.

The walking call module may derive a plurality of preliminary ride positions according to a size of the road in the area within the predetermined range based on the starting position, and derive each path to move by the taxi from a plurality of preliminary ride positions to the destination derive, and a plurality of ride candidate positions are determined from a plurality of preliminary ride positions based on a result of comparing distances of each of the derived paths with each other.

The general call module may determine an expected fare expected to be taken on the path from the general ride point to the destination by taxi, and provide the expected fare to the user terminal.

The walking call module may determine a first fare expected to be taken on the path to travel by the taxi from the walking ride point to the destination and a second fare expected to be taken on the path to travel by the taxi from the general ride point to the destination, and provide the first fare and the second fare to the user terminal.

The walking call module may request a call to the driver terminal forming the walking ride group and the driver terminal forming the general ride group based on the ride point indicated by the signal received from the user terminal among the walking ride point and the general ride point.

The walking call module may dispatch the call to one of a plurality of first driver terminals when the plurality of first driver terminals among the driver terminals receiving the call request acceptance of the call request.

The walking call module, when the plurality of first driver terminals have accepted the call request based on the walking ride point, predicts a first travel time to arrive at the walking ride point by walking from the position of the user terminal, may predict a plurality of second travel times to arrive at the walking ride point by moving from each position of the plurality of first driver terminal to the taxi, determines a plurality of error times between the plurality of second travel times and the first travel time, and dispatching a call to one of the plurality of first driver terminals based on the plurality of error times.

The walking call module, when a plurality of first driver terminals have accepted the call request based on the general ride point, may predict a time to arrive at the walking ride point by moving by the taxi from each position of a plurality of first driver terminals, and dispatches a call to one driver terminal of the plurality of first driver terminals based on the predicted time.

Through the present disclosure, it is possible to provide the method and system for determining the ride position based on the road non-preference map of the driver and the weather information.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2A and FIG. 2B is a screen for providing a ride positioning service according to an exemplary embodiment of the present disclosure.

Figure 1:
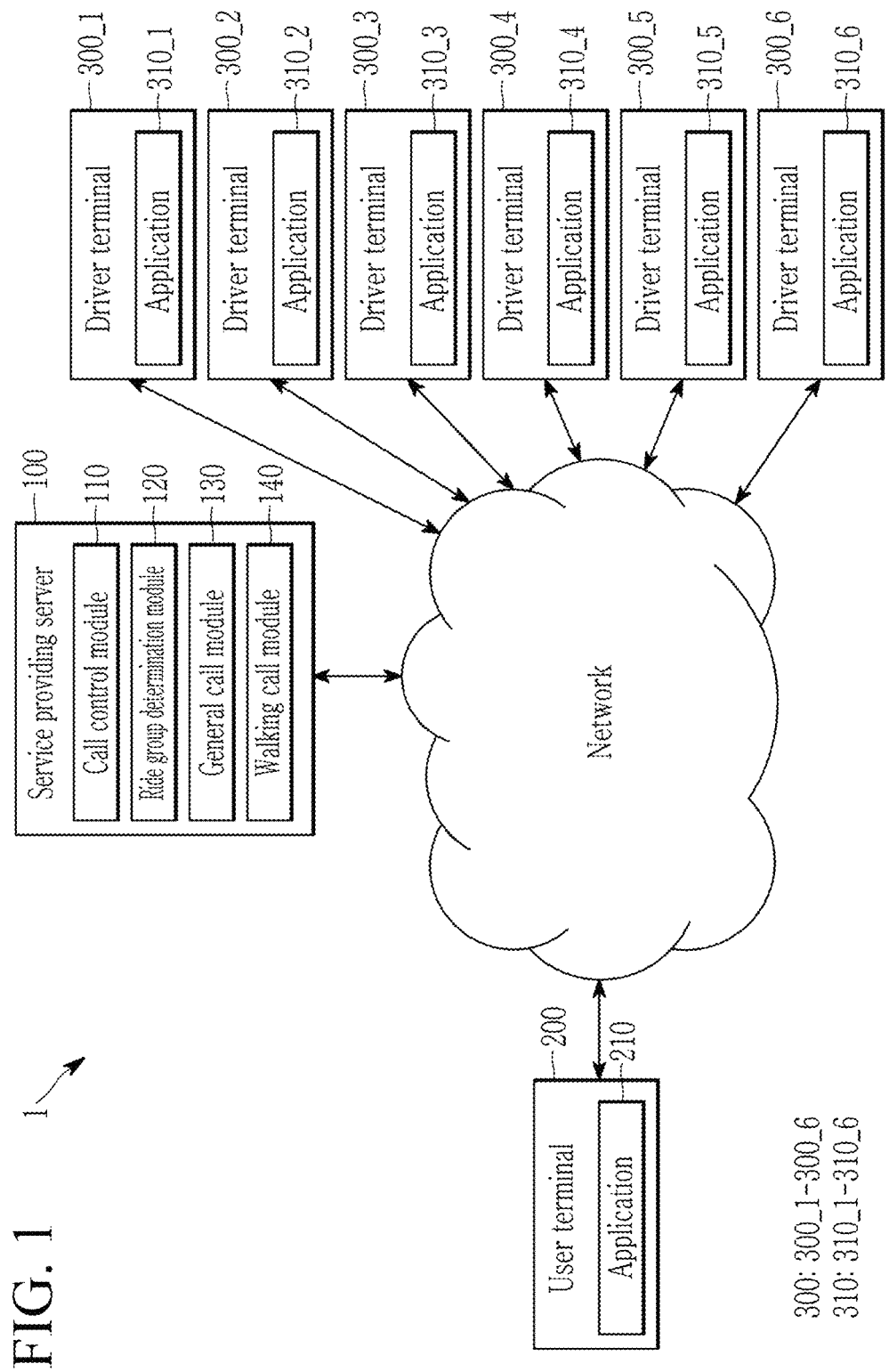
FIG. 1 is a block diagram schematically showing a configuration of a ride positioning service providing system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various embodiments of the present disclosure relates to a method and system for providing a service for determining a ride position of a user and dispatching a call to a driver terminal as a service providing server that received a taxi call request from a user considers weather and non-preference options regarding a one-way street of the driver terminal, alleys, etc. The service providing server may provide a specific position requiring a movement on foot from a departure point as a taxi ride position to the user through the application.

Through this, it is possible to reduce a taxi fare by walking a certain distance, and in connection with the weather, it is possible to suggest a direction to avoid walking in case of rain, etc.

Hereinafter, embodiments included in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only to easily make a specification. Therefore, these terms do not have meanings or roles that distinguish them from each other in themselves. Furthermore, in describing embodiments of the present specification, when it is determined that a detailed description of the well-known art associated with the present disclosure may obscure the gist of the present disclosure, it will be omitted. In addition, the accompanying drawings are provided only to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It will be further understood that terms "comprise" or "have" used in the present specification specify the presence of stated features, numerals, steps, operations, components, parts, or a combination thereof, but do not preclude the presence or addition of one or more other features, numerals, steps, operations, components, parts, or a combination thereof.

In a configuration for controlling other configurations in a specific control condition among configurations according to an exemplary embodiment of the present disclosure, a program implemented as a set of instruction words embodying a control algorithm necessary to control other configurations may be installed. The control configuration may generate output data by processing input data and stored data according to the installed program. The control configuration may include a non-volatile memory to store the programs and a memory to store the data.

FIG. 1 is a block diagram schematically showing a configuration of a ride positioning service providing system according to an exemplary embodiment of the present disclosure.

Referring to FIG. 1, a ride positioning service providing system 1 includes a service providing server 100, a user terminal 200, and a plurality of driver terminals 300_1 to 300_6.

The service providing server 100, the user terminal 200, and a plurality of driver terminals 300_1 to 300_6 are connected to each other through a network.

The service providing server 100 may include a call control module 110, a ride group determination module 120, a general call module 130, and a walking call module 140.

Also, the application 210 is provided in the user terminal 200, and a plurality of applications 310_1 to 310_6 are provided in a plurality of driver terminals 300_1 to 300_6, respectively.

When describing common operational and technical characteristics of a plurality of driver terminals 300_1 to 300_6, a plurality of driver terminals 300_1 to 300_6 are collectively referred to as a driver terminal 300. Although the number of the driver terminals 300 is shown as 6, this is for convenience of explanation, and the number of the driver terminals 300 is not limited thereto.

Hereinafter, a driver using each of the driver terminals 300_1 to 300_6 may be referred to as a driver 1 to a driver 6. The driver 1 to the driver 6 may represent a person operating a taxi using a call dispatch according to the ride positioning service according to an exemplary embodiment of the present disclosure.

FIG. 2A and FIG. 2B is a screen for providing a ride positioning service according to an exemplary embodiment of the present disclosure.

The starting position and the destination of the call request may be input through the application 210 of the user terminal 200 (FIG. 2A). According to an exemplary embodiment of the present disclosure, the service providing server 100 may provide expected fare information based on the general ride point and expected fare information based on the walking ride point through the application 210 of the user terminal 200 (FIG. 2B).

In the following, the starting position is the starting point of the path that the user wants to move through the call request. Also, the destination is an end point of the path that the user wants to move through the call request.

The ride point is a position determined through the ride positioning service provided by the service providing server 100, and means a position in which the user rides a taxi to move from the starting position of the call request to the destination.

The general ride point may be determined through the service providing server 100 as a position where the user may ride a taxi directly without moving on foot from the starting position of the call request.

The walking ride point may be determined through the service providing server 100 as a position where the user can ride a taxi after moving a predetermined distance on foot from the starting position of the call request.

Figure 3:
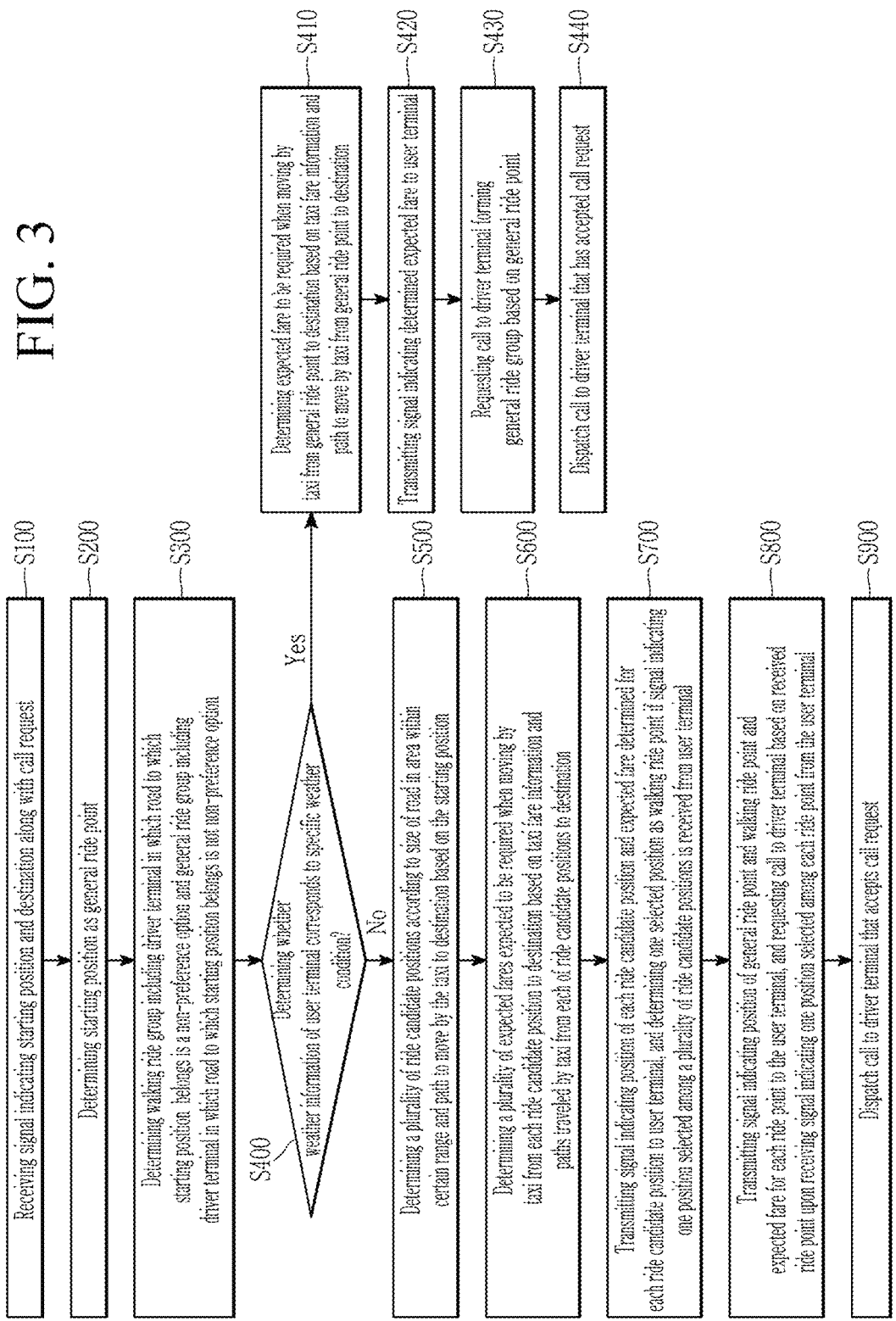
FIG. 3 is a flowchart of a ride positioning service providing method according to an exemplary embodiment of the present disclosure.

FIG. 3 is a flowchart of a method for providing a ride positioning service according to an exemplary embodiment of the present disclosure.

The call control module 110 receives a signal indicating the starting position and the destination along with the call request from the user terminal 200 (S100).

The call control module 110 may receive a signal indicating a position in which the user terminal 200 is positioned at a specific time from the user terminal 200. The call control module 110 may determine the position in which the user terminal 200 is positioned at a specific time point as the starting position.

Here, the specific time point may be any point in the period from the time when the user terminal 200 receives the starting position input from the user to the time when the service providing server 100 dispatches the call to the driver terminal 300.

The call control module 110 may determine the starting position as a general ride point (S200).

According to the ride positioning service according to an exemplary embodiment of the present disclosure, the user may make the call request by use of the position input by the user as the starting position as the ride point just like the general taxi call request, so that the starting position may be determined as the general ride point.

For example, when the call control module 110 determines the current position of the user terminal 200 as the starting position, the current position of the user terminal 200 may be determined as the general ride point.

The ride group determination module 120, for a plurality of driver terminals 300_1 to 300_6, determines a walking ride group including the driver terminal in which the road to which the starting position belongs is a non-preference option, and a general ride group including the driver terminal in which the road to which the starting position belongs is not the non-preference option (S300).

If the driver 1 to the driver 6 do not prefer a specific road type, the driver 1 to the driver 6 may select the corresponding road as the non-preference option and input it to each of the driver terminals 300_1 to 300_6. The ride group determination module 120 may receive the non-preference option for each terminal from each of driver terminals 300_1 to 300_6.

The specific road type may include certain types of roads such as pedestrian lanes, bike lanes, one-way streets, alleys, etc and certain types of road zones such as no-parking zones, children protection zones, bus stops, etc.

For example, if the driver using driver terminal 300_1 selects a one-way street as the non-preference option and the starting position of the call request belongs to the one-way street, the ride group determination module 120 may include the driver terminal 300_1 in the walking ride group.

Here, there may be a plurality of driver terminals forming each ride group.

Hereinafter, a driver terminal forming the walking ride group is represented by the driver terminals 300_1 to 300_3, and the driver terminal forming the general ride group is represented by the driver terminals 300_4 to 300_6. However, this is for convenience of description, and the number of driver terminals forming each walking ride group and general ride group is not limited to three, and may be an integer of 1 or more.

The call control module 110 may determine whether the weather information of the user terminal 200 corresponds to a specific weather condition (S400).

The specific weather condition may be determined based on the position of the user terminal 200 at a specific point in time. Here, the specific point in time may be any point in the period from the point in time when the service providing server 100 receives the call request from the user terminal 200 to the point in time when the call is dispatched to the driver terminal 300.

The call control module 110 may check the weather at the position of the user terminal 200 and determine that it is raining, which is one of the specific weather conditions, when it rains. The specific weather condition may include, in addition to the raining, an inclement weather such as snow and/or hail, heat waves, or extreme cold.

If the weather information of the user terminal 200 corresponds to the specific weather condition, the general call module 130 may determine the expected fare expected to be required when moving by the taxi from the general ride point to the destination based on the taxi fare information and the path to move by the taxi from the general ride point to the destination (S410).

For example, when it rains at the position of the user terminal 200, the general call module 130 may derive the path so that the entire moving distance from the same general ride point as the starting position to the destination may be moved by the taxi without moving by foot.

The taxi fare information may include a basic fare, a taxi fare rate, and the like.

The general call module 130 may derive the path to move by the taxi from the general ride point to the destination based on the distance from the ride point to the destination, the road usage fee, the estimated required time, and the like.

The general call module 130 may transmit a signal indicating the determined expected fare to the user terminal 200 (S420).

The general call module 130 may request the call to the driver terminals 300_4 to 300_6 forming the general ride group based on the general ride point (S430).

Because the driver terminals 300_1 to 300_3 forming the walking ride group use the road to which the starting position belongs as the non-preference option, the call request to ride the taxi at the starting position, which is the general ride point, is not received. Accordingly, only the driver terminals 300_4 to 300_6 forming the general ride group may receive the call request.

The general call module 130 may dispatch the call to the driver terminal that has accepted the call request (S440).

If there is one driver terminal that has accepted the call request, the general call module 130 may dispatch the call to one driver terminal that has accepted the call request.

In the call dispatch (S440), if a plurality of driver terminals 300_4 to 300_5 accept the call request, the general call module 130 may predict the times to arrive at the general ride point when moving by the taxi from each position of a plurality of driver terminals 300_4 to 300_5 to which the call is accepted.

The general call module 130 may receive a signal indicating the position in which a plurality of driver terminals 300_4 to 300_5 are positioned at a specific time point from a plurality of driver terminals 300_4 to 300_5. Here, the specific time point may be any point in the period from the time when the service providing server 100 receives the call request to the time at which the call is dispatched to one of the driver terminals 300.

The general call module 130 may determine the driver terminal to dispatch the call according to a result of comparing the estimated arrival times of each of driver terminals 300_4 to 300_5 that have accepted the call.

For example, when moving by the taxi from the current position of the driver terminal 300_4 to the general ride point, if the expected arrival time to the walking ride point is 10:00 and the expected arrival time of the driver terminal 300_5 is 10:15, the general call module 130 may dispatch the call to the driver terminal 300_4, which has the earlier expected arrival time.

If the weather information of the user terminal 200 does not correspond to the specific weather condition, the walking call module 140 may determine a plurality of ride candidate positions according to the size of the road in the area within a certain range and the path to move by the taxi to the destination based on the starting position (S500).

For example, if the weather at the position of the user terminal 200 is sunny, the user may consider moving from the starting position to the area within a certain range by walking. The walking call module 140 may determine a plurality of ride candidate positions for designating the walking ride point in the area within a predetermined range based on the starting position.

The predetermined range and the number of the ride candidate positions may be received from the user terminal 200, or may be determined in advance by the service providing server 100 as initial information. For example, three ride candidate positions may be determined at a distance within a 500 m radius based on the starting position.

Figure 4:
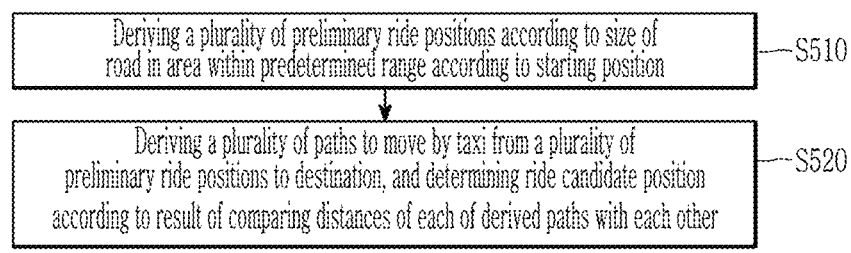
FIG. 4 is a detailed flowchart for explaining a step of determining a plurality of ride candidate points of FIG. 3.

FIG. 4 is a detailed flowchart for explaining a step of determining a plurality of ride candidate points of FIG. 3.

In FIG. 4, the walking call module 140 may derive a plurality of preliminary ride positions according to the size of the road in the area within a predetermined range based on the starting position (S510).

For example, the walking call module 140 may derive the specific position on the road, in which the size of the road is two or more round trip lanes, as a preliminary ride position to facilitate the entry of the vehicle.

The number of the preliminary ride positions may be greater than or equal to the number of the ride candidate positions.

The walking call module 140 may derive a plurality of paths to move by the taxi from a plurality of preliminary ride positions to the destination, and determine the ride candidate position according to a result of comparing the distances of each of the derived paths with each other (S520).

The walking call module 140 may determine the preliminary ride position including the shortest distance to the destination as the ride candidate position, giving preference to the preliminary ride position including the longest distance to the destination.

For example, three positions may be determined as the ride candidate positions in the order of the closest distance to the destination among ten preliminary ride positions.

The walking call module 140 may determine a plurality of expected fares expected to be required when moving by the taxi from each ride candidate position to the destination based on the taxi fare information and the paths traveled by the taxi from each of ride candidate positions to the destination (S600).

The walking call module 140 may transmit a signal indicating the position of each ride candidate position and the expected fare determined for each ride candidate position to the user terminal 200, and may determine one selected position as the walking ride point if a signal indicating one position selected among a plurality of ride candidate positions is received from the user terminal 200 (S700).

Figure 5:
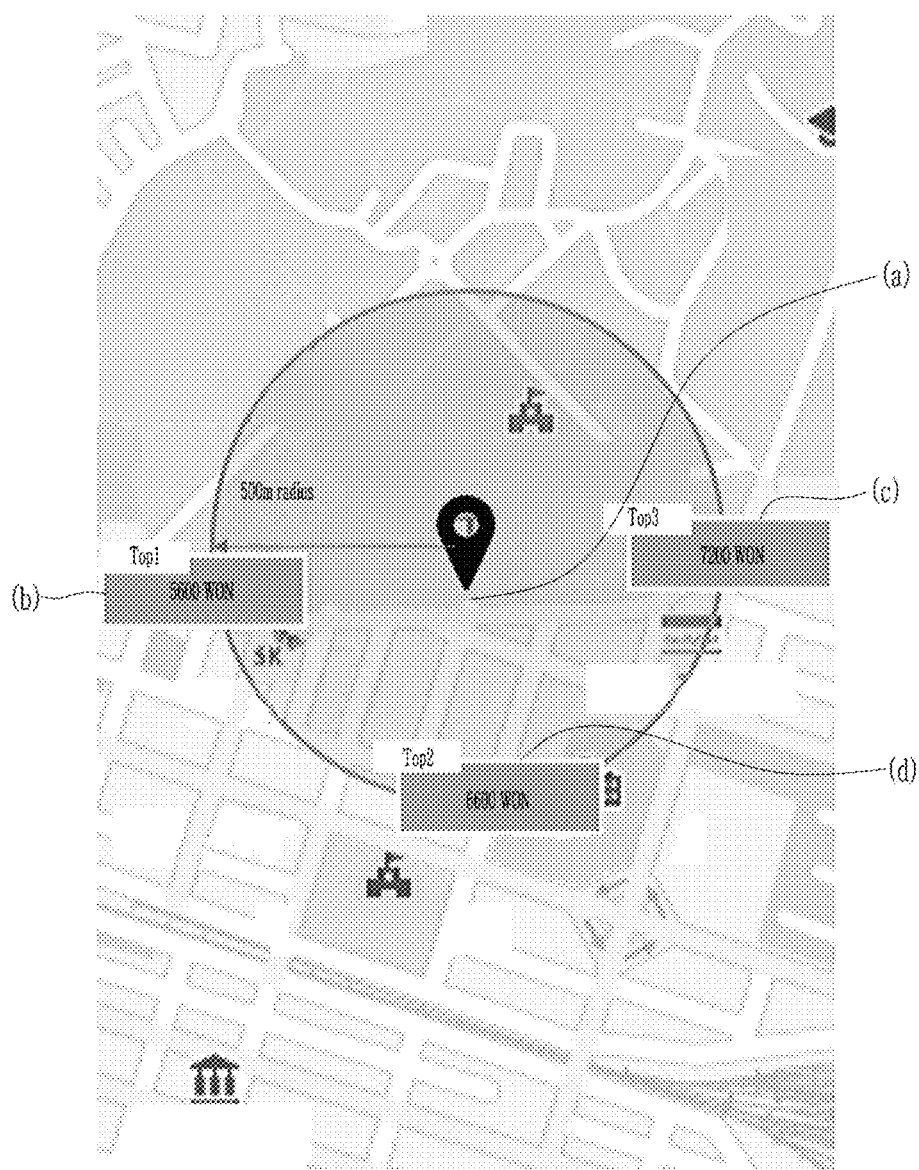
FIG. 5 is a screen for providing a ride positioning service according to an exemplary embodiment of the present disclosure.

FIG. 5 is a screen for providing a ride positioning service according to an exemplary embodiment of the present disclosure.

Referring to FIG. 5, the starting position (a) of FIG. 5 and a plurality of ride candidate positions (b) of FIG. 5, (c) of FIG. 5, and (d) of FIG. 5 in an area within a radius of 500 m from the starting position may be provided through the application 210 of the user terminal 200. The starting position and a plurality of ride candidate positions may be displayed as a position on the map like in FIG. 5.

The user may select one position among a plurality of ride candidate positions displayed through the application 210 to be input to the user terminal 200. The user terminal 200 may transmit a signal indicating one position selected by the user among a plurality of ride candidate positions to the walking call module 140.

In FIG. 3, the walking call module 140 may transmit a signal indicating the position of the general ride point and the walking ride point, and the expected fare for each ride point to the user terminal 200, and may request the call to the driver terminal based on the received ride point upon receiving a signal indicating one position selected among each ride point from the user terminal (S800).

The walking call module 140 may determine the expected fare expected to be required when moving by the taxi from the walking ride point to the destination based on the taxi fare information and the path to travel by the taxi from the walking ride point to the destination.

The walking call module 140 may determine the expected fare expected to be required when moving by the taxi from the general ride point to the destination based on the taxi fare information and the path to travel by the taxi from the general ride point to the destination.

Referring to FIG. 2B, the expected fare for each ride point may be provided through the application 210 of the user terminal 200. In FIG. 2B, a taxi riding at a general ride point is represented as "a general taxi", and a taxi riding at a walking ride point is represented as "a walking taxi".

The user may select one position among the walking ride point and the general ride point displayed through the application 210 to be input to the user terminal 200.

The walking call module 140 may dispatch the call to the driver terminal that accepts the call request (S900).

If the position selected by the user is the walking ride point, the walking call module 140 may request the call to each of the driver terminals 300_1 to 300_6 forming the walking ride group and the general ride group based on the ride point received from the user terminal 200. At the instant time, each of the driver 1 to the driver 6 may accept the call request through the applications 310_1 to 310_6 of the driver terminals 300_1 to 300_6.

Alternatively, if the position selected by the user is the general ride point, the walking call module 140 may request the call to each of the driver terminals 300_4 to 300_6 forming the general ride group based on the ride point received from the user terminal 200. At the instant time, the driver 4, the driver 5, and the driver 6 may each accept the call request through the applications 310_4 to 310_6 of the driver terminals 300_4 to 300_6.

If there is one driver terminal that has accepted the call request, the walking call module 140 may dispatch the call to one driver terminal that has accepted the call request.

In the call dispatch (S900), when a plurality of driver terminals 300_4 to 300_5 accept the call request based on the general ride point, the walking call module 140 may predict the times to arrive at the general ride point when moving by the taxi from each position of a plurality of driver terminals 300_4 to 300_5 to which the call is accepted.

The walking call module 140 may receive, from a plurality of driver terminals 300_4 to 300_5, a signal indicating the position in which a plurality of driver terminals 300_4 to 300_5 are positioned at a specific time point. Here, the specific time point may be any point in the period from the time when the service providing server 100 receives the call request to the time at which the call is dispatched to one of the driver terminals 300.

The walking call module 140 may determine the driver terminal to dispatch the call based on a result of comparing the estimated arrival times of each of driver terminals 300_4 to 300_5 that have accepted the call.

Figure 6:
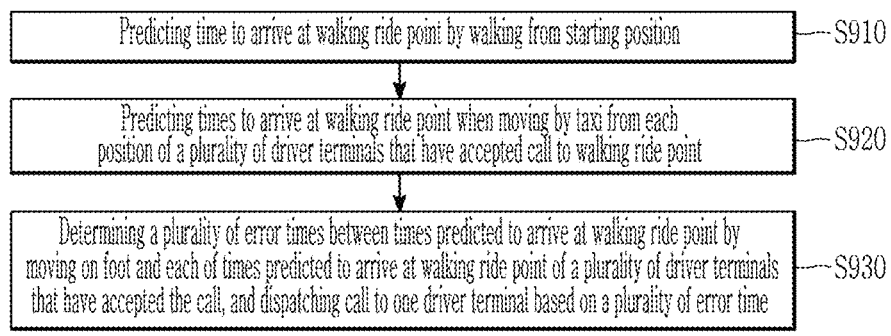
FIG. 6 is a detailed flowchart for explaining a case in which a plurality of driver terminals accept a call request based on a walking ride point in a call dispatch step.

FIG. 6 is a detailed flowchart for explaining a case in which a plurality of driver terminals accept a call request based on a walking ride point in a call dispatch step.

The walking call module 140 predicts the time to arrive at the walking ride point by walking from the starting position (S910).

Because the walking ride point does not match the starting position and the ride point, the walking call module 140 derives the walking path from the starting position to the walking ride point. The walking call module 140 may predict the time for the user to arrive by the walking to the walking ride point based on the walking path from the starting position to the walking ride point.

The walking call module 140, if a plurality of driver terminals 300_1 to 300_2 accept the call, may predict the times to arrive at the walking ride point when moving by the taxi from each position of a plurality of driver terminals 300_1 to 300_2 that have accepted the call to the walking ride point (S920).

The position of each of driver terminals 300_1 to 300_2 that have accepted the call may be determined based on an arbitrary time in the period from the time when the present service providing server 100 receives the call request to the time when the call is dispatched to one of the driver terminals 300_1 to 300_2.

The walking call module 140 may determine a plurality of error times between the times predicted to arrive at the walking ride point by moving on foot and each of the times predicted to arrive at the walking ride point of a plurality of driver terminals that have accepted the call, and dispatch the call to one driver terminal based on a plurality of error times (S930).

In other words, the walking call module 140 may dispatch the call to the driver configured for minimizing the difference between the time that the user arrives at the walking ride point and the time the taxi operated by the driver drives arrives at the walking ride point.

For example, it may be assumed that the walking call module 140 requests the call to the driver terminals 300_1 to 300_3 and receives the call acceptance from the driver terminals 300_1 to 300_2. In the example, it may be predicted that the predicted time for the user to arrive at the walking ride point by the walking is 10:00, the predicted time for the driver 1 to travel by the taxi to arrive at the walking ride point is 10:15, and the predicted time for the driver 2 to travel by the taxi to arrive at the walking ride point is 10:05. At the instant time, because the error time of the driver terminal 300_1 of the driver 1 is 15 minutes and the error time of the driver terminal 300_2 of the driver 2 is 5 minutes, the walking call module 140 may dispatch the call to the driver terminal 300_2 with the small error time.

When one of a plurality of driver terminals 300 is dispatched for the call request based on the general ride point, the general call module 130 or the walking call module 140 may provide the arrival information of the taxi dispatched through the application 210 of the user terminal 200.

When the driver terminal 300_2 is dispatched for the call request based on the walking ride point, the walking call module 140 may provide the walking path of the user and the arrival information of the dispatched taxi through the application 210 of the user terminal 200.

The arrival information of the dispatched taxi may include the name of the driver of the dispatched taxi, the vehicle number of the dispatched taxi, the vehicle type of the dispatched taxi, and the estimated arrival time of the dispatched taxi.

Figure 7:
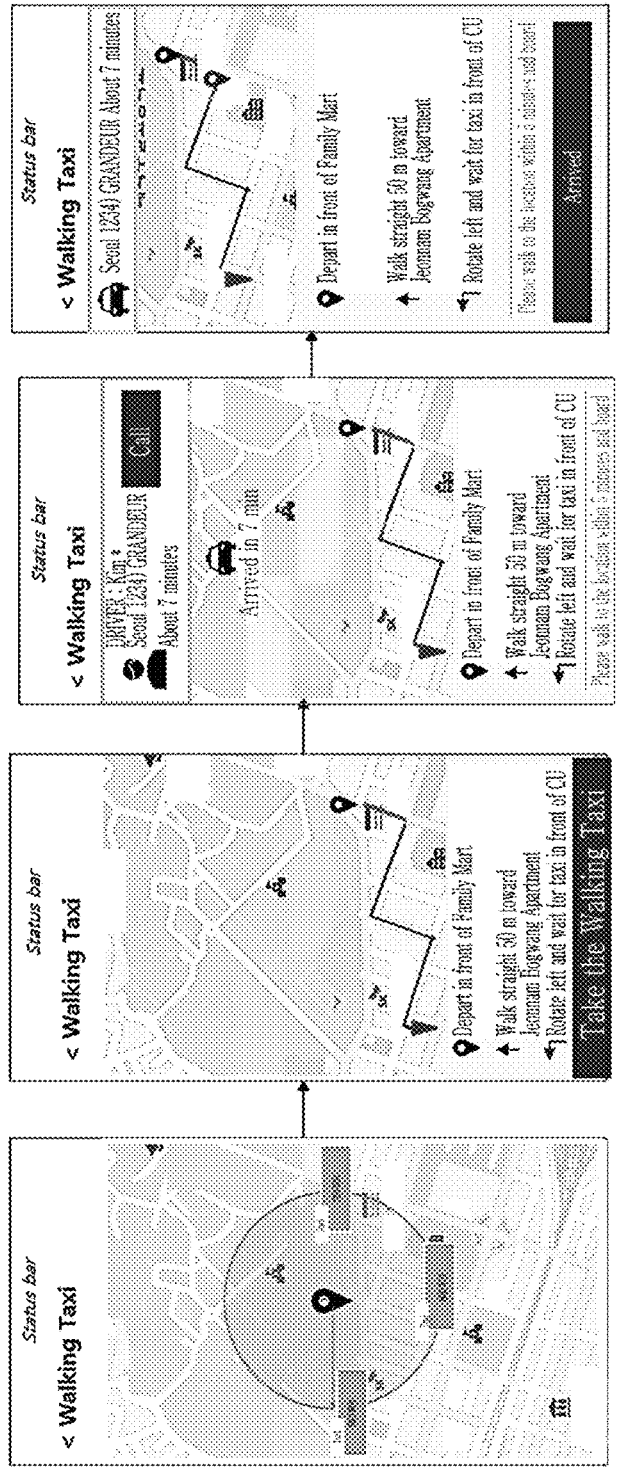
FIG. 7 is a screen for providing a ride positioning service according to an exemplary embodiment of the present disclosure.

FIG. 7 is a screen for providing a ride positioning service according to an exemplary embodiment of the present disclosure.

In FIG. 7, the walking path is displayed in the following order: "Depart in front of Family Mart", "Walk straight 50 m toward Jeonnam Bogwang Apartment", and "Rotate left and wait for taxi in front of CU".

In FIG. 7, it is displayed that the name of the driver of the dispatched taxi is "Kim*", the vehicle number of the dispatched taxi is "Seoul 1234", the vehicle type of the dispatched taxi is "GRANDEUR", and the estimated arrival time of the dispatched taxi is "About 7 minutes".

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A ride positioning service providing method comprising:

receiving, by a service providing server, a starting position and a destination along with a call request from a user terminal;

receiving, by the service providing server, a non-preference option for a predetermined road type from a plurality of driver terminals;

determining, by the service providing server, a walking ride group including driver terminals using a road to which the starting position belongs as the non-preference option and a general ride group including driver terminals not using a road to which the starting position belongs as the non-preference option among the plurality of driver terminals;

determining, by the service providing server, the starting position as a general ride point of a taxi;

determining, by the service providing server, one position selected based on a size of a road to which the one position belongs and a path to move by the taxi from an area within a predetermined range based on the starting position as a walking ride point of the taxi; and requesting, by the service providing server, a call to the driver terminal forming at least one group among the walking ride group and the general ride group based on at least one ride point among the walking ride point and the general ride point based on whether weather information of a position of the user terminal corresponds to a specific weather condition, wherein the requesting of the call to the driver terminal forming at least one group includes:
  requesting, by the service providing server, the call to the driver terminal forming the walking ride group and the driver terminal forming the general ride group based on one ride point selected among the walking ride point and the general ride point when the weather information does not correspond to the specific weather condition, and
  requesting, by the service providing server, the call to the driver terminal forming the general ride group based on the general ride point when the weather information of the position of the user terminal corresponds to the specific weather condition, and wherein the determining as the walking ride point includes:
  determining, by the service providing server, a plurality of ride candidate positions according to a size of the road in the area within the predetermined range and the path to be moved by the taxi to the destination based on the starting position; and
  determining, by the service providing server, a position indicated by a signal received from the user terminal among the plurality of ride candidate positions as the walking ride point; and
  displaying on a screen of the user terminal, a map including the plurality of ride candidate positions within a predetermined radius from the starting position, and when a ride candidate position of the plurality of ride candidate positions is selected, a path to the selected ride candidate position on the screen of the user terminal.

2. The ride positioning service providing method of claim 1, wherein the requesting of the call to the driver terminal forming the walking ride group and the driver terminal forming the general ride group includes:
  determining, by the service providing server, a first fare expected to be required on a path to move by the taxi from the walking ride point to the destination;
  determining, by the service providing server, a second fare expected to be required on a path to move by the taxi from the general ride point to the destination; and
  providing, by the service providing server, the first fare and the second fare to the user terminal.

3. The ride positioning service providing method of claim 1, wherein the requesting of the call to the driver terminal forming the general ride group includes:
  determining, by the service providing server, an expected fare expected to be required on a path to move by the taxi from the general ride point to the destination; and
  providing, by the service providing server, the expected fare to the user terminal.

4. The ride positioning service providing method of claim 1, wherein the determining of a plurality of ride candidate positions includes:
  deriving, by the service providing server, a plurality of preliminary ride positions according to the size of the road in the area within the predetermined range based on the starting position; and
  deriving, by the service providing server, each path to move by the taxi from the plurality of preliminary ride positions to the destination, and determining the plurality of ride candidate positions among the plurality of preliminary ride positions according to a result of comparing distances of each of the derived paths with each other.

5. The ride positioning service providing method of claim 1, further including:
  dispatching, by the service providing server, a call to one of a plurality of first driver terminals that have accepted the call request.

6. The ride positioning service providing method of claim 5, wherein
  in response that the plurality of first driver terminals have accepted the call request based on the walking ride point, the dispatching of the call includes:
  predicting, by the service providing server, a first travel time to arrive at the walking ride point by moving on foot from the position of the user terminal;
  estimating, by the service providing server, a plurality of second travel times to arrive at the walking ride point by moving from each position of the plurality of first driver terminals by the taxi;
  determining, by the service providing server, a plurality of error times between the plurality of second travel times and the first travel time; and
  dispatching, by the service providing server, a call to one of the plurality of first driver terminals based on the plurality of error times.

7. The ride positioning service providing method of claim 5, wherein
  in response that a plurality of first driver terminals have accepted the call request based on the general ride point, the dispatching of the call includes:
  predicting, by the service providing server, a time to arrive at the walking ride point by moving by the taxi from each position of the plurality of first driver terminals; and
  dispatching, by the service providing server, a call to one driver terminal of the plurality of first driver terminals based on the predicted time.

8. A ride positioning service providing system for receiving a call request, a starting position of the call request, and a destination of the call request from a user terminal, and transmitting the call request to a plurality of driver terminals, the system comprising:

a service providing server configured for receiving a non-preference option for a predetermined road type from the plurality of driver terminals, determining a walking ride group including a driver terminal using a road to which the starting position belongs as the non-preference option and a general ride group including a driver terminal not using the road to which the starting position belongs as the non-preference option, determining the starting position as a general ride point of a taxi, determining one position selected based on a size of a road to which the one position belongs and a path to move by the taxi from an area within a predetermined range based on the starting position as a walking ride point of the taxi, and requesting a call to the driver terminal forming at least one group of the walking ride group and the general ride group based on at least one ride point of the walking ride point and the general ride point based on whether weather information of a position of the user terminal corresponds to a specific weather condition, wherein the service providing server is configured to:
determine a plurality of ride candidate positions according to a size of the road in the area within the predetermined range based on the starting position and a path to move by the taxi to the destination, and
determine the walking ride point as a position indicated by a signal received from the user terminal among the plurality of ride candidate positions;
display on a screen of the user terminal, a map including the plurality of ride candidate positions within a predetermined radius from the starting position, and when a ride candidate position of the plurality of ride candidate positions is selected, a path to the selected ride candidate position on the screen of the user terminal.

9. The ride positioning service providing system of claim 8, wherein the service providing server includes:
a call control module configured for receiving the starting position and the destination from the user terminal to determine the starting position as the general ride point of the taxi;
a ride group determination module configured for receiving the non-preference option for each terminal from the plurality of driver terminals, and determining the walking ride group including the driver terminal having the road to which the starting position belongs as the non-preference option and a general ride group including the driver terminal not taking the road to which the starting position belongs as the non-preference option;
a general call module configured for requesting a call to the driver terminal forming the general ride group based on the general ride point in response that the weather information of the position of the user terminal corresponds to the specific weather condition; and
a walking call module configured for determining one position selected from the area within the predetermined range as the walking ride point of the taxi based on the starting position in response that the weather information does not correspond to the specific weather condition, and requesting a call request to the driver terminal forming the walking ride group and the driver terminal forming the general ride group based on one ride point selected from the walking ride point and the general ride point.

10. The ride positioning service providing system of claim 9,
wherein the general call module is configured to determine an expected fare expected to be taken on the path from the general ride point to the destination by the taxi, and provides the expected fare to the user terminal.

11. The ride positioning service providing system of claim 9,
wherein the walking call module is configured to determine a first fare expected to be taken on the path to travel by the taxi from the walking ride point to the destination and a second fare expected to be taken on the path to travel by the taxi from the general ride point to the destination, and provides the first fare and the second fare to the user terminal.

12. The ride positioning service providing system of claim 11,
wherein the walking call module requests a call to the driver terminal forming the walking ride group and the driver terminal forming the general ride group based on a ride point indicated by a signal received from the user terminal among the walking ride point and the general ride point.

13. The ride positioning service providing system of claim 12,
wherein the walking call module dispatches the call to one of a plurality of first driver terminals in response that the plurality of first driver terminals among the driver terminals receiving the call request accept the call request.

14. The ride positioning service providing system of claim 13,
wherein in response that the plurality of first driver terminals have accepted the call request based on the walking ride point, the service providing server predicts a first travel time to arrive at the walking ride point by walking from the position of the user terminal, and the walking call module is configured to predict a plurality of second travel times to arrive at the walking ride point by moving from each position of the plurality of first driver terminals to the taxi, to determine a plurality of error times between the plurality of second travel times and the first travel time, and to dispatch a call to one of the plurality of first driver terminals based on the plurality of error times.

15. The ride positioning service providing system of claim 13,
wherein in response that the plurality of first driver terminals have accepted the call request based on the general ride point, the walking call module is configured to predict a time to arrive at the walking ride point by moving by the taxi from each position of the plurality of first driver terminals, and to dispatch a call to one driver terminal of the plurality of first driver terminals based on the predicted time.

16. The ride positioning service providing system of claim 8,
wherein the walking call module derives a plurality of preliminary ride positions according to the size of the road in the area within the predetermined range based on the starting position, and derives each path to move by the taxi from the plurality of preliminary ride positions to the destination derive, and a plurality of ride candidate positions are determined from the plurality of preliminary ride positions based on a result of comparing distances of each of the derived paths with each other.

* * * * *